United States Patent Office.

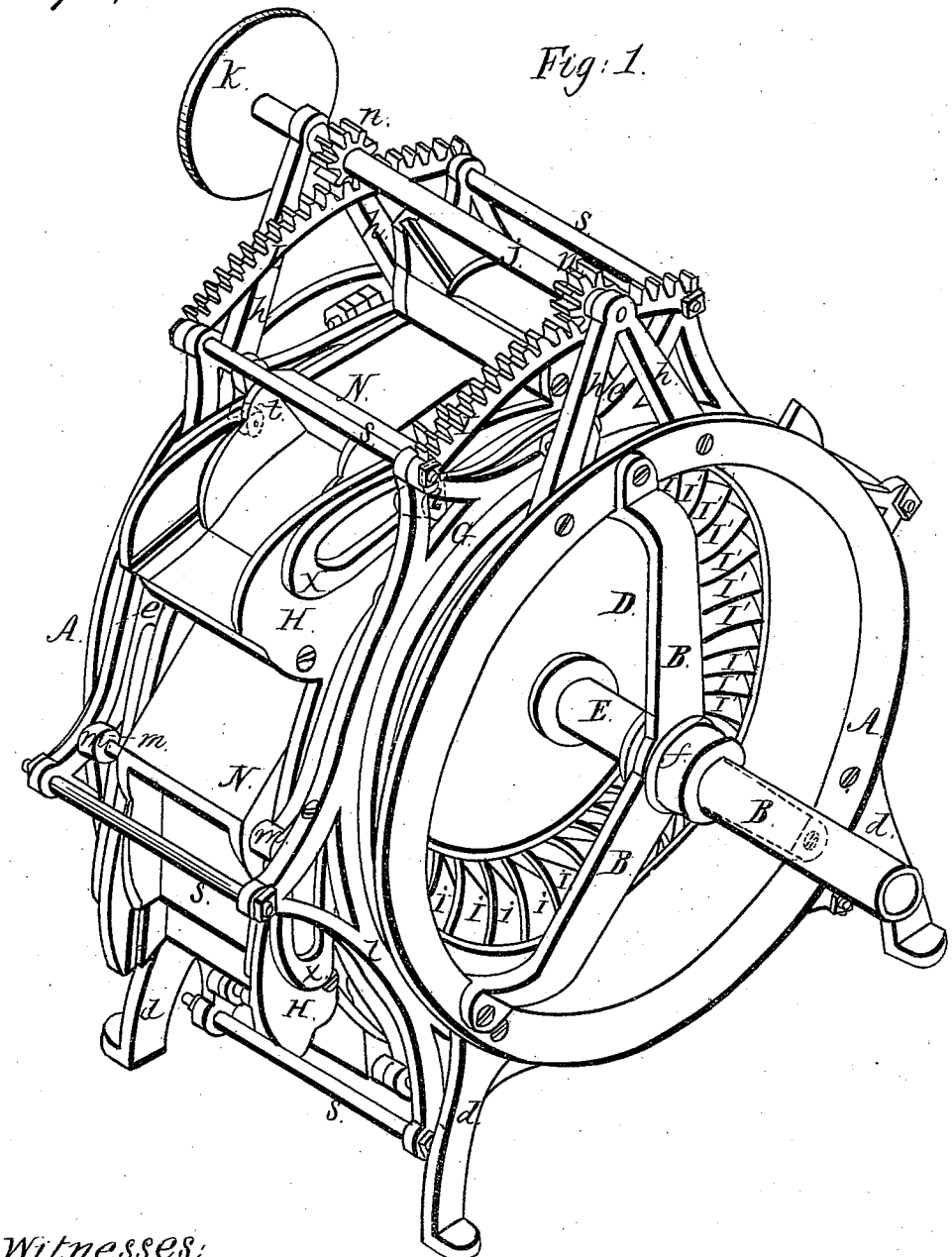

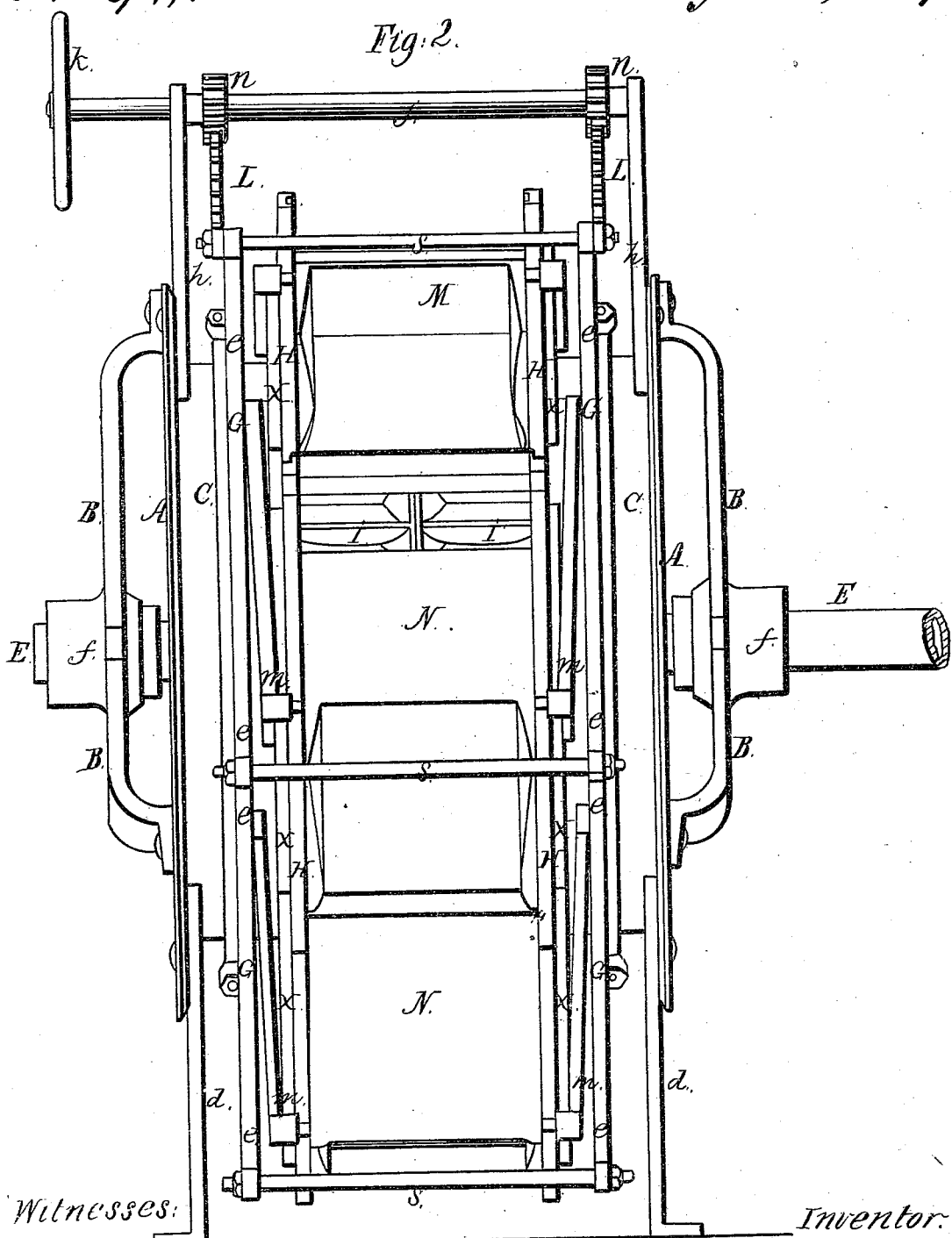

OTIS J. HODGE, OF NORTH ADAMS, MASSACHUSETTS.

Letters Patent No. 94,111, dated August 24, 1869.

IMPROVEMENT IN WATER-WHEELS.

The Schedule referred to in these Letters Patent and making part of the same.

*To all whom it may concern:*

Be it known that I, OTIS J. HODGE, of North Adams, in the county of Berkshire, and State of Massachusetts, have invented certain new and useful Improvements in Turbine Water-Wheels; and I do hereby declare that the following is a full, clear, and exact description thereof, reference being had to the accompanying drawings, and to the letters of reference marked thereon, which form a part of this specification, in which—

Figure 1 represents a perspective view of my wheel and its surroundings.

Figure 2 is a front elevation of the same.

The nature of my invention consists in constructing a water-wheel with two series of buckets, as hereinafter described.

It further consists in constructing adjustable chutes to regulate the quantity of water for driving the wheel by certain devices fully set forth.

In the drawings annexed—

D represents the water-wheel furnished with two series of buckets $i$, the series being separated by a partition extending around the circumference of said wheel.

The wheel D is suspended within a frame consisting of vertical rims A A, the said rims being furnished with flanges $c\ c$. (See fig. 2.)

B represents three arms, the outer ends of which are bolted to the rim A, and the inner ends firmly attached to hub $f$.

The hubs $f$ furnish bearings for the shaft E of the water-wheel.

In order to elevate the frame to the desired height, four legs, $d$, are firmly bolted to the rims A A.

G G constitute a circular frame designed to revolve as far as required around the flanges $c\ c$.

$e\ e\ e$ designate a number of arms cast solid with frames G G. The said arms are formed in the segment of a circle, with the concave surface upward, and being solid where their ends unite, are perforated at that point to receive the rods $s$, which bind the frames G together.

Inside of each of the arms $e$, are pivoted at one end the adjustable arms or braces $m$, the other end of said braces being perforated to receive the metal rods that pass through the rear end of the chute N.

The chutes N, it will be observed, are made smooth on the surface that conveys the water to the wheel D; but from the point through which the rods pass, as above described, the chute N is formed into a scoop, which receives and drains off any surplus water, which would otherwise reach the rear of the wheel D, and impede the motion.

H represents the gates which correspond in number with the chutes. The gates H are grooved in the inner surface of each side, in order to receive a tongue on the chute, thus allowing said chutes to move backward or forward, so as to enlarge or diminish the aperture through which the water flows to wheel D.

To facilitate the motion of the chutes N, the braces $m$ are provided with the shank $t$, having a friction-roller at its lower end, which plays in slotted plates $x$, on the outer surface of gates H.

$h\ h$ represent braces, bolted at their lower end to rims A A, and, united at their upper end, serve as bearings to the shaft $j$, the said shaft being furnished with pinions $n\ n$, and the operating-wheel K.

L L designate two cogged segments bolted to arms $e$, and gearing into pinions $n$.

In the construction of my water-wheel it will be seen that the buckets differ in form from those in common use, being convexo-concave, and lapping each other to the distance of about one-third of their width, and being open at bottom to allow the water to discharge itself when its office is performed.

By the adjustability of the chutes, my wheel can be readily adapted to the capacity of the stream that supplies wheel; and by operating pinions $m$, by means of wheel K, the cogged segments L L will be moved forward and diminish the opening through which the water reaches the wheel D, or by reversing the motion, the opening will be enlarged and the flow of water increased.

Having thus described my invention,

What I claim, and desire to secure by Letters Patent, is—

1. The wheel D, furnished with buckets $i\ i$, arranged substantially as and for the purpose set forth.

2. The movable frames G G, constructed and operated substantially as and for the purpose set forth.

3. The chutes H, constructed as and for the purpose specified.

4. The sliding gates N N, constructed and operating substantially as set forth.

5. The combination of the chutes H H and the sliding gates N N, substantially as set forth.

6. The combination, substantially as herein set forth, of the wheel D, movable frames G G, chutes H H, and gates N N.

In testimony that I claim the foregoing as my own, I affix my signature, in presence of two witnesses.

OTIS J. HODGE.

Witnesses:
H. M. STREETER,
DEXTER SMITH.